United States Patent [19]
Cayen et al.

[11] 3,988,965
[45] Nov. 2, 1976

[54] TWO PRESSURE COUNTERBALANCE SYSTEM FOR MACHINE TOOL HEADSTOCKS

[75] Inventors: Donald J. Cayen; Orville W. Ehrhardt; Richard V. Fatke, all of Fond du Lac, Wis.

[73] Assignee: Giddings & Lewis, Inc., Fond du Lac, Wis.

[22] Filed: Dec. 16, 1971

[21] Appl. No.: 208,854

[52] U.S. Cl................................ 90/11 F; 408/239 R
[51] Int. Cl.² ........................................... B23C 1/02
[58] Field of Search............... 408/235; 90/11 F, 15, 90/16

[56] References Cited
UNITED STATES PATENTS
3,181,424   5/1965   Miller et al. ..................... 408/235 X

*Primary Examiner*—Gil Weidenfeld
*Attorney, Agent, or Firm*—Leydig, Voit, Osann, Mayer & Holt Ltd.

[57] ABSTRACT

A counterbalance mechanism for a vertically movable machine tool headstock in which the net counterbalance force applied to the headstock is the same for both upward and downward movement of the headstock so that the accuracy of the spindle alignment is not disturbed by such movement. The counterbalance mechanism includes a hydraulic control system which automatically provides a greater pressure to a hydraulic counterbalance cylinder during raising movement of the headstock than during lowering movement so that difference in forces exerted by the counterbalance cylinder as a result of said pressure differential compensates for frictional resistive forces in the counterbalance mechanism and thereby enables the same net counterbalance force to be applied to the headstock.

11 Claims, 9 Drawing Figures

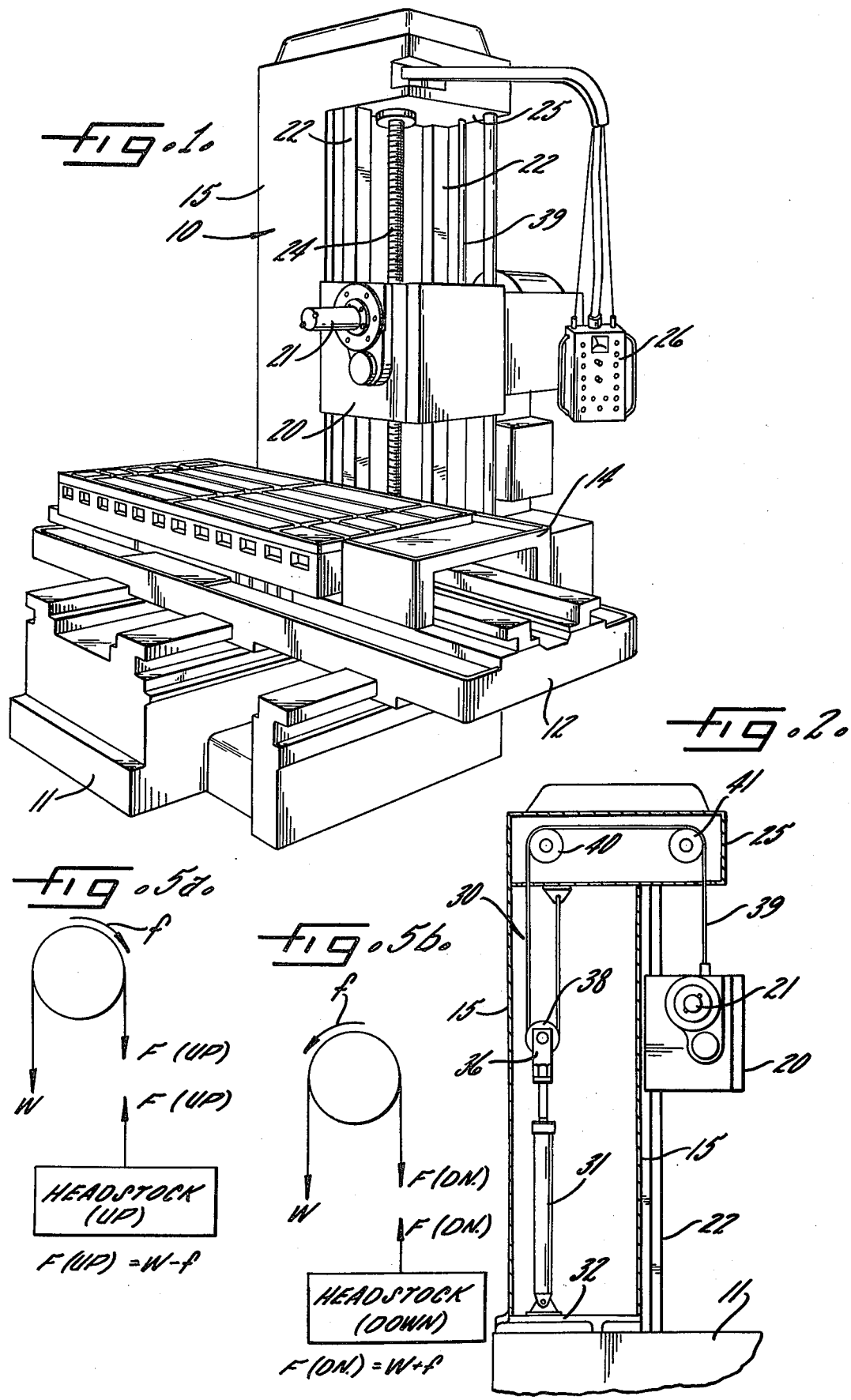

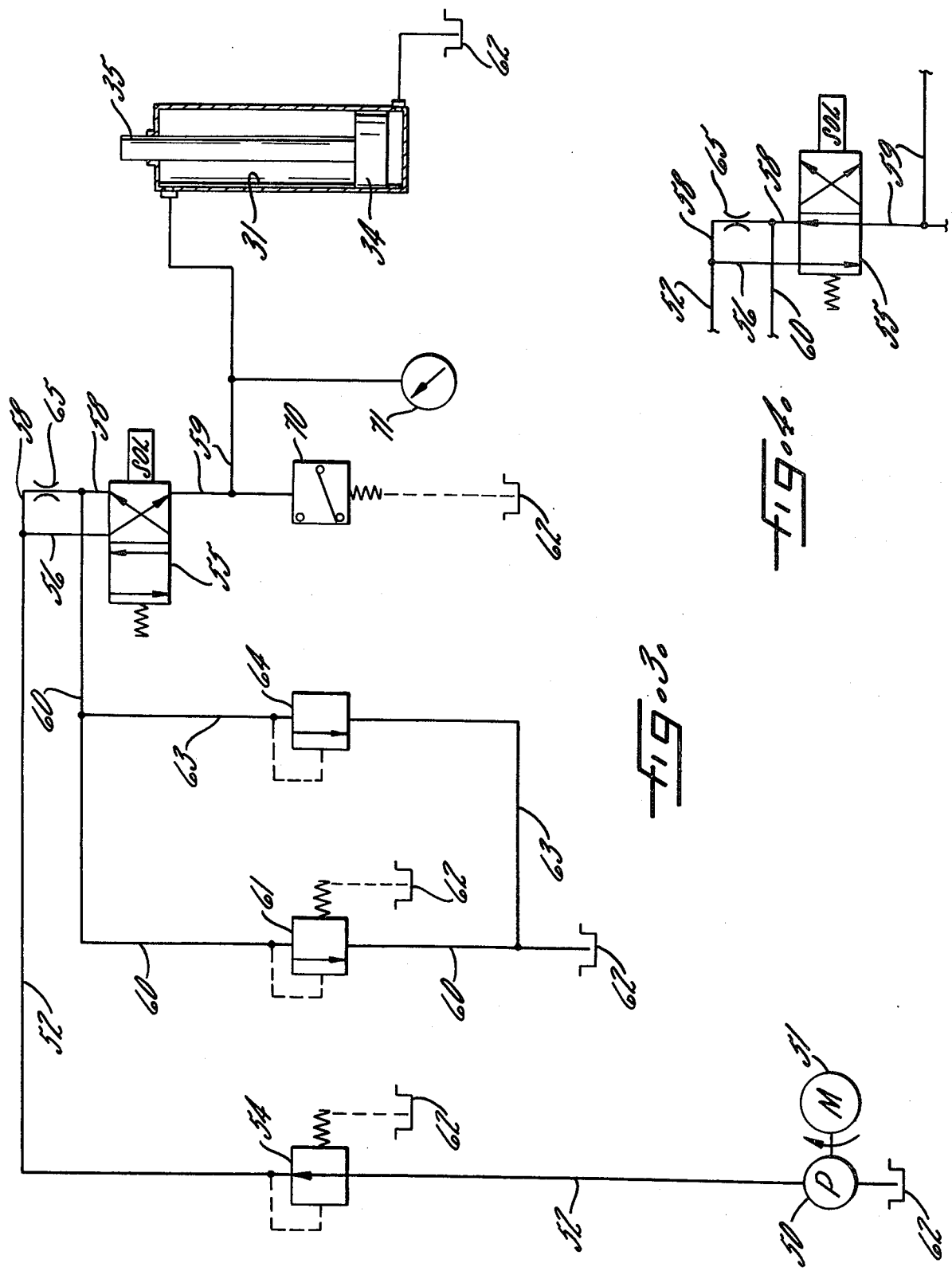

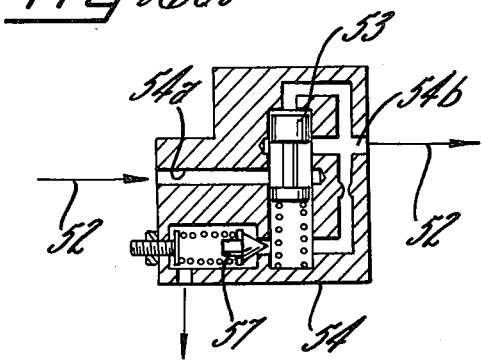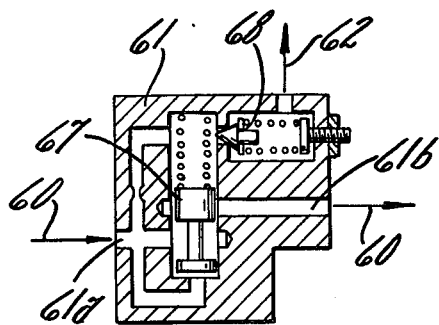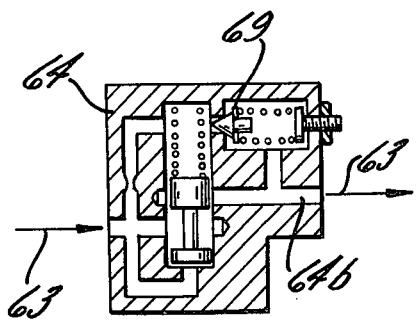

TWO PRESSURE COUNTERBALANCE SYSTEM FOR MACHINE TOOL HEADSTOCKS

DESCRIPTION OF THE INVENTION

The present invention relates to machine tools, and more particularly to counterbalance systems for vertically slidable headstocks of precision machine tools such as horizontal boring, drilling and milling machines and the like.

One of the problems that has arisen in the operation of precision machine tools is maintaining accurate spindle orientation while the headstock is vertically traversed. It is important that the machine tool spindle remain aligned within a few seconds' accuracy in both the horizontal and vertical planes when translated from one vertical position to another. The use of antifriction guideways for machine tool headstocks has greatly increased the potential accuracy obtained by present day machines. However, if design considerations prevent the elevating screw from being in line with the counterbalance chain, unbalanced moments are induced which act upon the headstock. As a result, it has been difficult to counterbalance the headstock to facilitate its upward and downward travel without disturbing the spindle orientation and thereby affecting the machining accuracy.

It is an object of the present invention to provide a counterbalance system for a machine tool headstock which assists vertical adjustment of the headstock while not adversely affecting the accuracy of the spindle alignment.

Another object of the invention is to provide a counterbalance system as characterized above in which the counterbalance force applied to the headstock is the same for both upward and downward movement of the headstock.

Other objects and advantages of the invention will become apparent upon reading the following detailed description and upon reference to the drawings in which:

FIG. 1 is a perspective of a typical machine tool embodying the present invention;

FIG. 2 is a vertical section of the machine shown in FIG. 1 illustrating the counterbalancing mechanism of the machine;

FIG. 3 is a schematic diagram of the hydraulic control system for the counterbalancing mechanism shown in FIG. 2;

FIG. 4 is a schematic of a portion of the hydraulic control system shown in FIG. 3 with the solenoid valve switched to the headstock lowering position; and FIGS. 5a and 5b are schematic force diagrams showing the net counterbalance force applied to a headstock as it is being raised and lowered respectively;

FIGS. 6a–c are more detailed schematic drawings of the pressure reducing, sequence, and relief valves, respectively, included in the hydraulic control system shown in FIG. 3.

While the invention is susceptible to various modifications and alternative forms, a specific embodiment thereof has been shown by way of example in the drawings and will herein be described in detail. It should be understood, however, that it is not intended to limit the invention to the particular form disclosed but, on the contrary, the intention is to cover all modifications, equivalents and alternatives falling within the spirit and scope of the invention.

Referring now to FIG. 1 of the drawings, there is shown an illustrative horizontal boring, drilling, and milling machine 10 embodying the present invention. The machine 10 comprises a bed 11 supporting a saddle 12 for longitudinal sliding movement thereon. The saddle 12, in turn, supports a work table 14 for transverse sliding movement. An upstanding column 15 is fixed to one end of the machine bed 11 and carries a vertically movable headstock 20. The headstock has a spindle 21 mounted therein which may be rotatably and axially driven by suitable drive and feed motors.

The column 15 preferably is provided with antifriction guideways 22 on which the headstock 20 slides. To vertically move the headstock 20 a feed screw 24 is mounted between the bed 11 and an overhanging section 25 of the column 15 and cooperates with an appropriate nut carried in the headstock 20. Selective rotation of the feed screw 24 by a conventional drive motor will adjust the vertical position of the headstock. Operation of the machine tool 10 in this case is controlled by a swinging pendant control 26.

To assist in vertically positioning the headstock 20, a counterbalance mechanism 30 is provided (FIG. 2). The counterbalance mechanism 30 includes a hydraulic counterbalance cylinder 31 located within the column 15 and secured at a lower end to a plate 32 mounted on the machine bed 11. The cylinder 31 has a piston 34 reciprocally mounted therein with a piston rod 35 extending vertically upward from the piston (FIGS. 2 and 3). The upper end of the piston rod 35 has a yoke 36 within which is rotatably mounted an idler pulley 38. A metal rope 39 in this case is secured at one end to the overhanging column section 25 and at the other end to the headstock 20 and is arranged to travel around the pulley 38 and over two idler pulleys 40 and 41 rotatably carried within the upper column section 25. A counterbalancing force may thereby be applied to the headstock through the rope 39 by applied of hydraulic pressure to the cylinder 31.

It has been found that a constant counterbalance force, such as applied by a metal counterweight or by a hydraulic cylinder acting under a constant pressure, does not necessarily insure that the net counterbalance force actually applied to the headstock is the same for both upward and downward travel of the headstock, and if different counterbalance forces are applied to the headstock the orientation of the spindle may be altered. When a counterweight or hydraulic cylinder is connected to the headstock by means of a chain or metal rope supported by one or more sheaves, such as the rope 39 and pulleys 38, 40, 41 in the illustrated machine, a resistive frictional force results from the operation of the rope over the pulleys.

Referring to force diagram shown in FIG. 5a, the net counterbalance force ($F_{up}$) actually acting on the headstock as the headstock is being raised can be shown by the following equation:

$$F_{(up)} = W - f$$

W represents the weight of the counterweight or force from a hydraulic cylinder and $f$ represents the frictional force which acts in the direction to resist movement of the rope over the pulleys as the headstock is being raised. In other words, when elevating the headstock, the frictional force $f$ opposes the counterweight force W so that the net force acting on the headstock is less than the force of the counterweight W. It will be understood that while preferably the column has anti-friction guideways so that no significant frictional resistance results from movement of the headstock along the guideways, even if friction bearings were used, the friction force resulting from upward headstock movement on the guideways would resist the counterweight force W in the same manner as the rope frictional force and therefore could be included in the resistive friction force $f$ in determining the net counterweight force F. Likewise any other sources of frictional resistance that might arise in a particular machine, such as from movement of the piston relative to the seals of the hydraulic counterbalance cylinder, could be taken into account.

As the headstock is lowered, the force diagram of FIG. 5b shows that the net counterbalance force $F_{(dn)}$ acting on the headstock can be represented by the following equation:

$$F_{(dn)} = W + f$$

The friction force $f$ in this case acts to resist movement of the rope over the pulley in the opposite direction from that shown in FIG. 5a. Thus, the friction force $f$ assists the counterweight force W so that the net force acting on the headstock is greater than W. Again, any resistive friction force resulting from movement of the headstock along the column guideways would act in the same direction as the rope friction force and could be included in the resistive force $f$ in determining the net counterweight force F.

The two above equations illustrate that with a fixed counterweight force W, the net counterbalance force F actually applied to the headstock during its upward and downward movement varies by the amount $2f$. Such a difference in the net counterbalance force can affect the accuracy of the tool spindle alignment when the headstock is traversed in opposite directions and create undesirable inaccuracies in associated machining.

Accordingly, in accordance with the present invention, means are provided for applying to the headstock a net counterbalance force which is equal for both upward and downward directions of headstock movement. To this end, a hydraulic control system is provided by which hydraulic pressure applied to the counterbalance cylinder is greater during the upward travel of the headstock than it is for the downward travel by an amount which compensates for the frictional resistive forces incurred in the counterbalance mechanism.

Referring to FIG. 3, there is shown an illustrated hydraulic control system for the counterbalance mechanism of the present invention. A pump 50 driven by an appropriate electric motor 51 supplies pressurized hydraulic fluid into a main high pressure line 52. An adjustable high pressure reducing valve 54 is interposed in the line 52 to limit to a predetermined value the pressure in the line 52 downstream of the valve 54. The reducing valve 54, shown in detail on FIG. 6a, is a conventional two-stage pilot operated spool type reducing valve. Fluid passes into an inlet port 54a, around a pressure regulating spool 53, and out an outlet port 54b. When pressure in the inlet port 54a exceeds the desired predetermined downstream pressure, a spring biased pilot 57 is forced open, which in turn causes the spool 53 to shift downward, as viewed in FIG. 6a, toward a valve closing position which will limit the flow of fluid through the valve to the amount required to sustain the desired downstream pressure. Fluid flowing past the pilot 57 is externally drained to a common reservoir 62. The valve 54, therefore, will maintain a substantially constant pressure in the line 52 downstream of the valve. The high pressure line 52 downstream of the valve 61 is connected to a four-way solenoid operated valve 55 by conduits 56 and 58, and a line 59 connects the four-way valve 55 to the upper end of the cylinder 31.

When the feed screw 24 of the machine tool 10 is operated to move the headstock 20 upward, the solenoid operated four-way valve 55 is in the position shown in FIG. 3. Fluid under relatively high pressure passes through the line 52, line 56, solenoid valve 55, line 59 and enters the upper end of counterbalance cylinder 31. This pressure acts on the piston 34 and tends to move it in a downward direction causing a counterbalance force to be exerted on the headstock through the rope 39.

When the feed screw 24 is operated to move the headstock 20 downward, appropriate electrical circuitry (not shown) is provided to automatically switch the solenoid operated valve 55 to the right, as viewed in FIG. 3, to the position shown in FIG. 4. In that position, the four-way valve 55 blocks passage of high pressure fluid from the line 56. As the piston 34 is raised in the cylinder 31 during lowering of the headstock, pressurized fluid is permitted to discharge through the line 59, solenoid valve 55, line 58, and line 60. The line 60 is connected to an adjustable low pressure regulating valve 61 which maintains a predetermined lower pressure in the cylinder 31 and thereby governs the force exerted by the counterbalance cylinder 31 as the headstock lowers. The low pressure regulating valve 61 in this case is a conventional two-stage spool type sequence valve, shown in detail in FIG. 6b. The valve 61 includes a spool 67 which is normally spring biased to a closed position. When pressure in the inlet port 61a of the valve exceeds a predetermined value, a spring biased pilot 68 is opened to reduce the pressure adjacent the upper side of the spool, as viewed in FIG. 6b, so that the spool 67 is moved to an open position to permit the discharge of fluid through the outlet port 61b. When pressure in the inlet port 61a returns to the desired value as a result of the discharge of fluid through the valve, the pilot 68 and the spool 67 again return to their closed positions. Fluid which passes through the valve 61 is discharged into the common reservoir or sump 62 and is recirculated through the system. The fluid passing through the pilot 68 likewise is externally drained to the reservoir 62.

In the illustrated system, a relief valve 64 is connected in parallel with the regulating valve 61 by means of a line 63 and serves as a safety valve in the event of failure of the valve 61. The relief valve 64, shown in FIG. 6c, is a two-stage spool type relief valve. Such valve is similar to the sequence valve 61 except that the pilot 69 is not externally drained, but rather is drained into the valve outlet port 64b. While in the illustrated embodiment a sequence valve and relief valve are shown in parallel for regulating the pressure in the low pressure line 60, alternatively the valves 61 and 64 may both be the sequence type or the relief type. The sequence valve, however, has been found to be especially suited for regulating a uniform pressure in the line 60 by minimizing pressure surges resulting from the poppet action of the pilot.

To block the passage of high pressure fluid from the line 58 into the low pressure line 60 a bleeder orifice 65 is interposed in the line 58 immediately before the connection of the low pressure line 60. The bleeder orifice 65 substantially blocks the flow of high pressure fluid from the line 58, but permits a relatively small amount of fluid to pass through in order to replenish any fluid that may leak from the low pressure regulating valves 61 and 64 during the period the solenoid valve 55 is in the high pressure headstock raising position. This prevents a surge of pressure to the low pressure valves 61, 64 when the solenoid valve 55 is switched to low pressure position.

In order to interlock the machine and prevent its operation in the event of the absence of a predetermined hydraulic pressure in the counterbalance cylinder 31, a pressure switch 70 is connected to the line 59. The pressure switch 70, which may be actuated when the cylinder pressure is reduced to a determined value, may be connected to the electrical controls of the machine by known means. A gauge 71 also is connected to the line 59 to provide a constant reading of the pressure in the counterbalance cylinder 31. Any leakage of hydraulic fluid that may occur in the switch 70, reducing valve 54, low pressure relief valves 61 and 64, or the cylinder 31, is drained into the common reservoir 62.

It will be appreciated that since the high pressure reducing valve 54 and the low pressure regulating valves 61 and 64 are adjustable, the hydraulic control system of the present invention may be set to provide a predetermined high pressure to the counterbalance cylinders during upward movement of the headstock and a predetermined relatively lower pressure during downward movement of the headstock. This pressure differential, as explained previously, should be such that the resulting force differential from the hydraulic cylinder during upward and downward headstock movement is twice the frictional resistive forces incurred in operation of the counterbalance mechanism. Thus, by appropriately determining or estimating the frictional forces of the system, predetermined high and low pressures can be applied to the counterbalance cylinder so that the net counterbalance force applied to the headstock is equal for both upward and downward headstock movement. As a result, the use of the counterbalance system of the present invention prevents disturbance of the spindle alignment during vertical adjustment of the headstock and has enabled more accurate machining to be achieved that has heretofore been possible with such machines.

We claim as our invention:

1. A counterbalance system for a machine tool having a column, a vertically positionable member on said column, and power operated means for vertically moving said member, comprising a cylinder and a piston, one of which is movable and relative to the other, means connecting said member to the movable one of said piston and cylinder so that the latter is movable in opposite directions upon movement of said member in opposite directions, said connecting means exerting a counterbalance force on said member when pressurized fluid is supplied to said cylinder, said counterbalance system incurring a predetermined frictional resistance force which opposes downward movement of said member as said member is lowered and which opposes movement of the movable one of said cylinder and piston as said member is being raised, means for automatically supplying and maintaining a predetermined relatively high fluid pressure in said cylinder when said member is being raised so that said connecting means exerts a predetermined net counterbalance force on said member, and means for automatically maintaining a predetermined lower fluid pressure in said cylinder when said member is being lowered so that the differential force resulting from said high and low fluid pressures compensates for the frictional resistance force incurred by the counterbalance system and causes said connecting means to exert substantially the same net counterbalance force on said member when said member is being lowered as is exerted when said member is being raised.

2. The counterbalance system of claim 1 in which said piston is movable within said cylinder and the difference in forces exerted by said piston on said connecting means resulting from said high and low pressures is equal to approximately twice the frictional resistance force incurred by said counterbalance system.

3. The counterbalance system of claim 1 in which said high pressure supply means includes a first line and a pump means for supplying pressurized fluid to said first line, a high pressure reducing valve interposed in said first line for maintaining said predetermined high pressure fluid in said first line downstream of said reducing valve, control means for permitting the flow of said high pressure fluid from said first line to said cylinder during upward movement of said member and stopping the flow of said high pressure fluid to said cylinder during lowering movement of said member, and said low pressure maintaining means including a second line having a low pressure regulating valve, control means for selectively connecting said second line to said cylinder when said member is being raised for exhausting fluid through said second line and low pressure regulating valve as said member is raised.

4. The counterbalance system of claim 3 in which said control means for said first and second lines is a solenoid operated four-way valve, a third line connecting said four-way valve to said cylinder, said first line being connected to said four-way valve by a pair of lines, said second line being connected to said four-way valve through one of said lines, a bleeder orifice disposed in said one conduit upstream of the connection with said second line to prevent the discharge of high pressure fluid from said one conduit into said second line and said four-way valve.

5. The counterbalance system of claim 3 in which said high pressure reducing valve and said low pressure regulating valve each are adjustable to permit the selection of predetermined pressures to said cylinder during raising and lowering movement of said member.

6. The counterbalance system of claim 4 in which a pressure switch is connected to said third line for actuation when the pressure in said cylinder is reduced below a predetermined value, and means responsive to the actuation of said pressure switch for automatically stopping the operation of said machine.

7. The counterbalance balance system of claim 3 in which said high pressure reducing valve is a pilot operated spool type reducing valve, and said low pressure regulating valve is a two-stage sequence valve.

8. The counterbalance system of claim 3 in which said high pressure reducing valve is a pilot operated spool type relief valve, and said low pressure regulating valve is a two-stage relief valve.

9. The counterbalance system of claim 3 in which a relief valve is connected to said second line in parallel with said low pressure regulating valve.

10. A counterbalance system for a machine having a column, a vertically positionable member on said column, and means for vertically moving said member, comprising
- a cylinder and a piston, one of which is movable relative to the other,
- means connecting said member to the movable one of said piston and cylinder so that the latter is movable in opposite directions upon movement of said member in opposition directions, said connecting means incurring functional resistance forces during movement of said member,
- said connecting means exerting a counterbalance force on said member when pressurized fluid is supplied to said cylinder,
- means for supplying and maintaining a predetermined relatively low fluid pressure in said cylinder when said member is being lowered, said low fluid pressure causing said connecting means to exert a predetermined net counterbalance force on said member,
- and means for supplying and maintaining a predetermined relatively high fluid pressure in said cylinder when said member is being raised, said high fluid pressure being greater than said low fluid pressure by an amount which compensates for said frictional resistance forces so that said connecting means is caused to exert substantially the same net counterbalance force on said member when being raised as is exerted on said member when being lowered.

11. A counterbalance system for a machine having a column, a vertically positionable member on said column, and means for vertically moving said member, comprising
- a cylinder and a piston movable within said cylinder,
- means connecting said member to said piston so that said piston is movable in opposite directions upon movement of said member in opposite directions,
- said counterbalance mechanism incurring frictional resistance forces which oppose downward movement of said member as said member is lowered and which oppose movement of said piston in said cylinder as said member is raised,
- said connecting means exerting a counterbalance force on said member when pressurized fluid is supplied to said cylinder,
- means for supplying and maintaining a predetermined relatively low fluid pressure in said cylinder when said member is being lowered, said low fluid pressure causing said connecting means to exert a predetermined net counterbalance force on said member,
- and means for supplying and maintaining a predetermined relatively high fluid pressure in said cylinder when said member is being raised, said high fluid pressure being greater than said low fluid pressure by an amount such that the resulting differential force exerted by said connecting means on said member equals approximately twice said frictional resistance forces whereby substantially the same net counterbalance force is applied to said member by said connecting means when said member is being raised as is exerted on said member when being lowered.

* * * * *